(12) United States Patent
Song et al.

(10) Patent No.: US 11,196,096 B2
(45) Date of Patent: Dec. 7, 2021

(54) BATTERY PACK AND METHOD FOR CHARGING BATTERY PACK

(71) Applicant: Samsung SDI Co., Ltd., Yongin-si (KR)

(72) Inventors: Yongheui Song, Yongin-si (KR); Yoonphil Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 392 days.

(21) Appl. No.: 16/092,195

(22) PCT Filed: Apr. 13, 2017

(86) PCT No.: PCT/KR2017/003996
§ 371 (c)(1),
(2) Date: Oct. 8, 2018

(87) PCT Pub. No.: WO2017/188633
PCT Pub. Date: Nov. 2, 2017

(65) Prior Publication Data
US 2020/0335835 A1    Oct. 22, 2020

(30) Foreign Application Priority Data
Apr. 28, 2016 (KR) .................. 10-2016-0052309

(51) Int. Cl.
*H02J 7/00* (2006.01)
*H01M 10/42* (2006.01)
(Continued)

(52) U.S. Cl.
CPC ..... *H01M 10/4257* (2013.01); *H01M 10/441* (2013.01); *H01M 10/482* (2013.01);
(Continued)

(58) Field of Classification Search
CPC .......... H01M 10/4257; H01M 10/482; H01M 2/1016; H01M 10/486; H01M 10/441;
(Continued)

(56) References Cited

U.S. PATENT DOCUMENTS 6,326,767 B1 * 12/2001 Small ................... H02J 7/0045
320/116
7,786,699 B2 * 8/2010 Demers ................ H02J 7/0026
320/133
(Continued)

FOREIGN PATENT DOCUMENTS

CN    102082310 A    6/2011
JP    10-270092 A    10/1998
(Continued)

OTHER PUBLICATIONS

International Search Report of corresponding PCT/KR2017/003996, dated Jun. 30, 2017, 5 pages.
(Continued)

*Primary Examiner* — Richard Isla
*Assistant Examiner* — Mohammed J Sharief
(74) *Attorney, Agent, or Firm* — Lewis Roca Rothgerber Christie LLP

(57) ABSTRACT

A battery pack includes a battery including at least one battery cell, a cell balancing device configured to balance a voltage of the at least one battery cell, a switch unit including a charging switch and a discharging switch arranged on a high current path through which a charging current and a discharging current flow, and a battery management unit configured to monitor a voltage and a current of the battery, to control the cell balancing device, and to control charging and discharging operations of the battery, wherein when a state of the battery during charging with a constant current satisfies a preset swelling condition, the
(Continued)

battery management unit is configured to operate the cell balancing device for a preset discharging time to make the battery self-discharge, when the present discharging time passes, the battery management unit is configured to pause the battery from self-discharging for a preset pausing time, and when the preset pausing time passes, the battery management unit is configured to charge the battery.

11 Claims, 6 Drawing Sheets

(51) Int. Cl.
    *H01M 10/44*     (2006.01)
    *H01M 10/48*     (2006.01)
    *H01M 50/20*     (2021.01)

(52) U.S. Cl.
    CPC ......... *H01M 10/486* (2013.01); *H01M 50/20* (2021.01); *H02J 7/0019* (2013.01); *H02J 7/0048* (2020.01); *H02J 7/0071* (2020.01); *H02J 7/007194* (2020.01); *H01M 2010/4271* (2013.01)

(58) Field of Classification Search
    CPC ....... H01M 2010/4271; H02J 7/007194; H02J 7/0048; H02J 7/0071; H02J 7/0019; H02J 7/0031
    USPC .......................................... 320/134
    See application file for complete search history.

(56) References Cited

U.S. PATENT DOCUMENTS

| | | | |
|---|---|---|---|
| 8,283,893 B2 | 10/2012 | Lee et al. | |
| 8,896,271 B2 | 11/2014 | Kim et al. | |
| 9,252,623 B2 | 2/2016 | Sim et al. | |
| 2013/0033231 A1* | 2/2013 | Zhang | H02J 7/0031 320/116 |
| 2013/0214741 A1 | 8/2013 | Lee et al. | |
| 2014/0062387 A1* | 3/2014 | Kim | H02J 7/0071 320/107 |
| 2014/0203782 A1* | 7/2014 | Xue | H02J 7/007 320/134 |
| 2014/0239908 A1* | 8/2014 | Ichikawa | H02J 7/0016 320/134 |
| 2016/0013676 A1* | 1/2016 | Kaji | H02J 7/0068 320/134 |
| 2016/0201634 A1* | 7/2016 | Kim | H01M 10/486 320/136 |

FOREIGN PATENT DOCUMENTS

| | | | |
|---|---|---|---|
| JP | 2013-179763 A | 9/2013 | |
| JP | 2013-179766 A | 9/2013 | |
| KR | 10-2006-0060830 A | 6/2006 | |
| KR | 10-2008-0017157 A | 2/2008 | |
| KR | 10-2010-0090198 A | 8/2010 | |
| KR | 10-2011-0058378 A | 6/2011 | |
| KR | 10-2014-0040027 A | 4/2014 | |

OTHER PUBLICATIONS

Written Opinion of the International Searching Authority of corresponding PCT/KR2017/003996, dated Jun. 30, 2017, 8 pages.
China Office action issued in application No. CN 201780025523.3 dated Dec. 2, 2020, with full English translation, 21 pages.

\* cited by examiner

BATTERY PACK AND METHOD FOR CHARGING BATTERY PACK

CROSS-REFERENCE TO RELATED APPLICATION(S)

This application is a National Phase Patent Application of International Patent Application Number PCT/KR2017/003996, filed on Apr. 13, 2017, which claims priority of Korean Patent Application No. 10-2016-0052309, filed Apr. 28, 2016. The entire contents of both of which are incorporated herein by reference.

TECHNICAL FIELD

The present disclosure relates to a battery pack and a battery pack charging method.

BACKGROUND ART

A secondary cell converts chemical energy to electrical energy and outputs the electrical energy. On the other hand, the secondary cell receives electrical energy and stores the electrical energy in the form of chemical energy. That is, the secondary cell is a battery that is rechargeable and dischargeable repeatedly. As use of portable electronic devices, for example, mobile phones, digital cameras, laptop computers, etc. has constantly increased, batteries for supplying electric power to portable electronic devices have been actively developed.

During constant current charging of a secondary battery, there is a section where a temperature in the secondary battery rapidly increases, and at this time, an internal resistance may increase. In the secondary battery, a phase transition of an active material and decomposition of an electrolyte may generate side reactants between positive/negative electrodes, a Li-plating, a gas, etc., which may accelerate a swelling effect. When the swelling effect occurs, performance degradation of the secondary battery occurs and it is impossible to correct this performance degradation. Also, the swelling effect may cause an electric short-circuit in the battery, and then, when an external shock is applied to the secondary battery, a spark, etc. may be generated and the risk of ignition of the battery increases.

Therefore, it is important to reduce generation of gases and side reactants in the secondary battery to prevent the swelling effect of the battery. To do this, when an internal temperature of the battery in a charging state rapidly increases, rising of the internal temperature needs to be restrained by controlling the charging operation in order to reduce the occurrence of side reactions in the battery.

DESCRIPTION OF EMBODIMENTS

Technical Problem

Provided is a battery pack with a reduced swelling effect due to restriction of a sudden increase of an internal temperature in a battery that is in a charging state.

Solution to Problem

According to an aspect of the present disclosure, a battery pack includes: a battery comprising at least one battery cell; a cell balancing device configured to balance a voltage of the at least one battery cell; a switch unit comprising a charging switch and a discharging switch arranged on a high current path through which a charging current and a discharging current flow; and a battery management unit configured to monitor a voltage and a current of the battery, to control the cell balancing device, and to control charging and discharging operations of the battery, wherein, when a state of the battery during charging with a constant current satisfies a preset swelling condition, the battery management unit is configured to operate the cell balancing device for a preset discharging time to make the battery self-discharge, when the preset discharging time elapses, the battery management unit is configured to pause the battery from self-discharging for a preset pausing time, and when the preset pausing time elapses, the battery management unit is configured to charge the battery.

The battery pack may further include a self-discharge unit connected to the battery in parallel and configured to discharge the battery according to control of the battery management unit, wherein the battery management unit may be configured to operate the self-discharge unit to make the battery self-discharge.

The battery pack may further include a temperature sensor configured to sense a temperature of the battery, wherein the preset swelling condition may be a condition in which a variation in the temperature sensed by the temperature sensor according to time is equal to or greater than a preset value.

The preset swelling condition may be a condition in which a state of charge (SOC) of the battery reaches a preset SOC value.

The battery may be charged with a variable constant current, and the battery management unit is configured to determine that the preset swelling condition may be satisfied when a magnitude of the constant current changes.

The preset SOC value may be within a range of about 60% to about 80%.

The preset swelling condition may include a case in which the variation in the temperature according to time may be equal to or greater than the preset value and the SOC of the battery is equal to or greater than the preset SOC value.

According to an aspect of the present disclosure, a method of charging a battery pack, the method includes: charging a battery with a constant current; sensing a preset swelling condition; discharging the battery for a preset discharging time when the battery satisfies the preset swelling condition; pausing the battery from discharging for a preset pausing time when the preset discharging time passes; and restarting the charging of the battery.

The sensing of the preset swelling condition may include: sensing a variation in a temperature of the battery; and determining that the preset swelling condition is satisfied when a slope of the variation in the temperature is equal to or greater than a preset slope.

The sensing of the preset swelling condition may include: monitoring a state of charge (SOC) of the battery; and determining that the preset swelling condition is satisfied when the SOC of the battery is equal to or greater than a preset SOC value.

In the charging of the battery, the battery may be charged with a variable constant current.

The sensing of the preset swelling condition may include: monitoring a magnitude of the constant current applied to the battery; and determining that the preset swelling condition is satisfied when the magnitude of the constant current changes.

In the discharging of the battery, the battery may be discharged by using a cell balancing device.

Advantageous Effects of Disclosure

A battery pack according to one or more embodiments may predict a section where a sudden increase of an internal temperature of a battery that is in charging state occurs, and may discharge and pause charging of the battery in the predicted section. Since the battery that is in charging state may be discharged and charging thereof may be paused in the predicted section, the sudden increase of the temperature in the battery may be reduced. In addition, performance degradation of the battery and increase in a resistance of the battery caused by a swelling effect may be reduced, and thus, the lifespan of the battery may increase.

MODE OF DISCLOSURE

Figure 1:
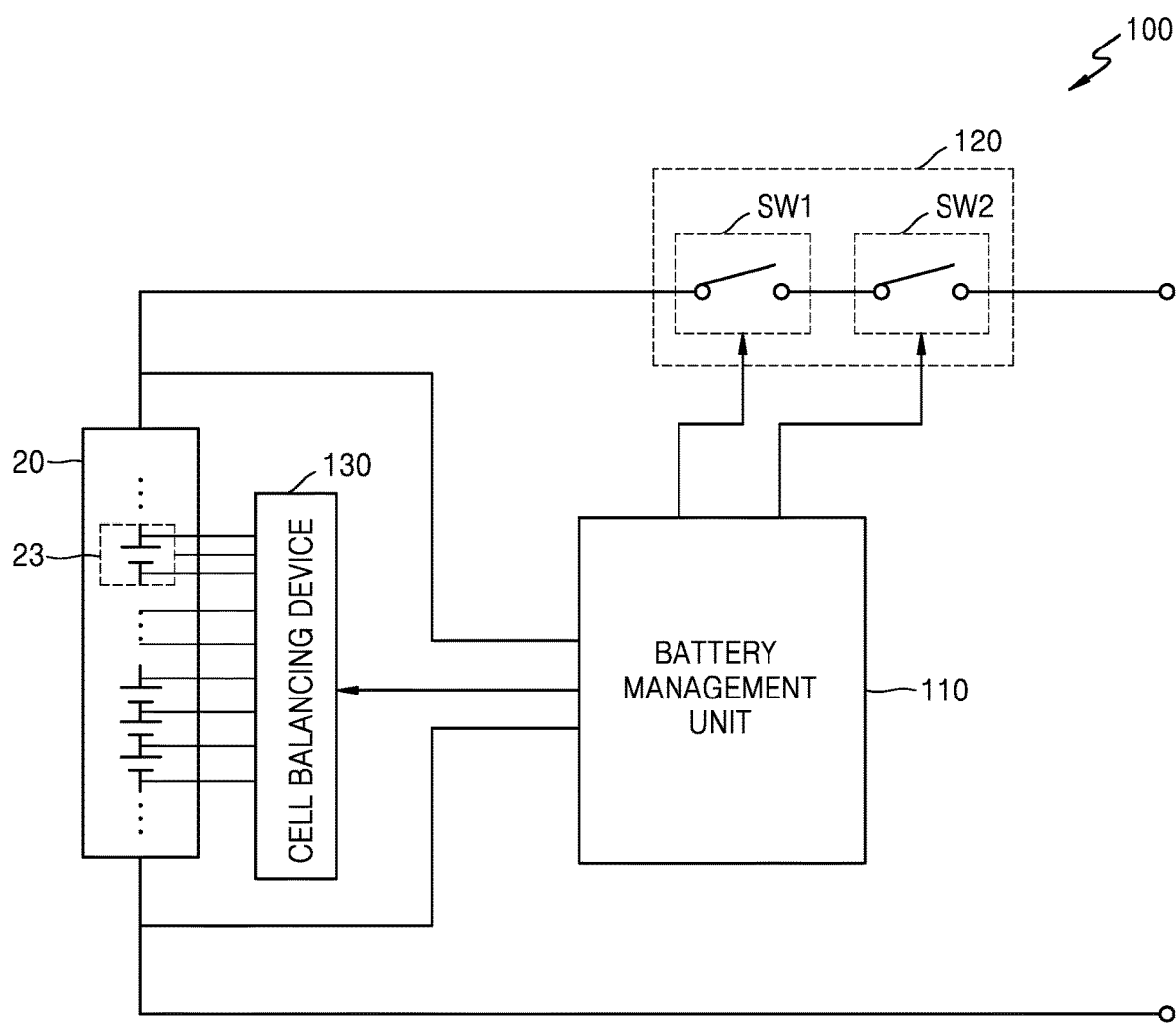
FIG. 1 shows an internal structure of a battery pack according to an embodiment.

The attached drawings illustrate one or more embodiments and are referred to in order to gain a sufficient understanding, the merits thereof, and the objectives accomplished by the implementation. However, this is not intended to limit the present disclosure to particular modes of practice, and it is to be appreciated that all changes, equivalents, and substitutes that do not depart from the spirit and technical scope are encompassed in the present disclosure. The embodiments suggested herein are for rendering the description of the present disclosure complete and are set forth to provide a complete understanding of the scope of the disclosure to one of ordinary skill in the art to which the present disclosure pertains. In the description, certain detailed explanations of the related art are omitted when it is deemed that they may unnecessarily obscure the essence of the present disclosure.

For example, specific shapes, structures, and features described in one exemplary embodiment may be modified in another exemplary embodiment within the scope of the present disclosure. In addition, the positions or arrangement of elements described in one exemplary embodiment may be changed in another exemplary embodiment within the scope of the present disclosure. Therefore, the detailed description provided hereinafter of the present disclosure shall not be limited, and the entire scope of the appended claims and their equivalents will fall within the scope and spirit of the disclosure. In the drawings, like or similar reference numerals denote like or similar elements. Details described in the present disclosure are examples. That is, such details may be changed in other exemplary embodiments within the scope of the present disclosure.

It will be understood that although the terms "first" and "second" are used herein to describe various elements, these elements should not be limited by these terms. Terms are only used to distinguish one element from other elements.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. It will be understood that although the terms "first," "second," etc. may be used herein to describe various components, these components should not be limited by these terms. These components are only used to distinguish one component from another. These components are only used to distinguish one component from another.

Hereinafter, the exemplary embodiments will be described in detail with reference to the accompanying drawings. In the drawings, like reference numerals denote like or corresponding elements, and repeated descriptions thereof will be omitted.

FIG. 1 shows an internal structure of a battery pack according to an embodiment.

Referring to FIG. 1, a battery pack 100 includes a battery 20, a charging switch SW1, a discharging switch SW2, a battery management unit 110, and a cell balancing device 130.

The battery 20 stores electric power and includes at least one battery cell 23. One battery cell 23 or a plurality of battery cells 23 may be included in the battery 20. The battery cells 23 may be connected to one another in series, in parallel, or a combination thereof. The number of battery cells 23 and the way of connecting the battery cells 23 included in the battery 20 may be determined according to a required output voltage and a power storage capacity.

The battery cell 23 may include a secondary battery that is rechargeable. For example, the battery cell 23 may include, but is not limited to, a nickel-cadmium battery, a lead storage battery, a nickel metal hydride (NiMH) battery, a lithium-ion battery, a lithium polymer battery, etc.

The battery management unit 110 may control a switch unit 120 to protect the battery 20. The battery management unit 110 may control flow of an electric current introduced into or discharged from the battery 20 by using the switch unit 120. For example, the battery management unit 110 may perform an over-charge protection, an over-discharge protection, an over-current protection, an over-voltage protection, an over-heat protection, a cell balancing, etc.

The battery management unit 110 may obtain information about a current, a voltage, a temperature, a remaining power amount, a lifespan, a state of charge (SOC), etc. of the battery 20. For example, the battery management unit 110 may measure a cell voltage and a temperature of the battery cell 23 by using sensors.

When sensing an abnormal state such as over-charging, over-discharging, over-current, high temperature, etc. in the battery 20, the battery management unit 110 may turn the charging switch SW1 and/or the discharging switch SW2 on to protect the battery 20. The battery management unit 110 may output a control signal for controlling the charging switch SW1 and/or the discharging switch SW2.

The switch unit 120 is arranged on a high current path through which a charging current and a discharging current flow. The high current path is a path connecting the battery 20 to charging/discharging terminals included in the battery pack, and thus, the battery 20, the charging/discharging terminals, and the switch unit 120 may be connected to one another in series. The switch unit 120 may block charging and discharging of the battery 20 according to the control signal from the battery management unit 110. The switch unit 120 may include a transistor or a relay. The switch unit 120 may include at least one of the charging switch SW1, the discharging switch SW2, and an additional protective switch. In addition, the switch unit 120 may include a relay switch capable of blocking both charging and discharging operations.

The cell balancing device 130 may perform cell balancing among the battery cells 23 according to control of the battery management unit 110. The cell balancing device 130 may perform the cell balancing by using a passive cell balancing method, in which an electric power of a battery cell 23 in a relatively high charged state is discharged through a balancing resistor (that is, resistance). When voltages of the battery cells 23 are different from one another, the cell balancing device 130 may discharge a battery cell 23 having a relatively greater voltage from among the battery cells 23. Due to the discharge of the battery cell 23, the voltages of the battery cells 23 may become equal to one another. The cell balancing device 130 may perform the cell balancing individually on each of the battery cells 23, or may perform the cell balancing after grouping a plurality of battery cells 23.

The cell balancing device 130 may consume energy stored in the battery cells 23. Since the cell balancing device 130 includes the balancing resistor, that is, a passive device, when the cell balancing device 130 operates, the cell balancing device 130 may consume the energy stored in the battery cells 23 by using the balancing resistor. The cell balancing device 130 may operate to make the battery 20 self-discharge to consume the energy stored in the battery cells 23 according to the control of the battery management unit 110.

According to an embodiment, the battery management unit 110 may determine whether a preset swelling condition is satisfied, and when the swelling condition is satisfied, the battery management unit 110 may stop charging of the battery 20 that is in a charging state, may make the battery 20 discharge, and may pause the battery 20. The battery management unit 110 monitors characteristics of the battery 20 that is in the charging state, and when a variation in the characteristic satisfies the preset swelling condition, the battery management unit 110 turns off the charging switch SW1 to stop the charging of the battery 20. While stopping the charging of the battery 20, the battery management unit 110 may make the battery 20 self-discharge for a preset discharging time. The self-discharge is for consuming the energy in the battery 20 by using a passive device in the battery pack, for example, the cell balancing device 130 included in the battery pack is operated to consume the energy of the battery 20. When the self-discharge time of the battery 20 exceeds the preset discharging time, the battery management unit 110 stops the self-discharge of the battery 20. For example, an operation of a self-discharging device (e.g., cell balancing device 130) consuming the energy of the battery 20 is stopped to stop the self-discharge of the battery 20. The battery management unit 110 may pause the battery 20 for a preset pausing time, and when the preset pausing time passes, the battery management unit 110 may turn on the charging switch SW1 of the battery 20 to restart the charging of the battery 20. That is, when a state of the battery 20 satisfies the preset swelling condition, the battery management unit 110 may stop the charging of the battery 20, may make the battery 20 self-discharge, and may pause the battery 20.

In addition, the preset discharging time and the preset pausing time are relevant with the characteristic of the battery 20 that is in the charging state, and are determined based on a time period that is necessary for stabilizing chemical reaction of the battery 20. This will be described later.

Figure 2:
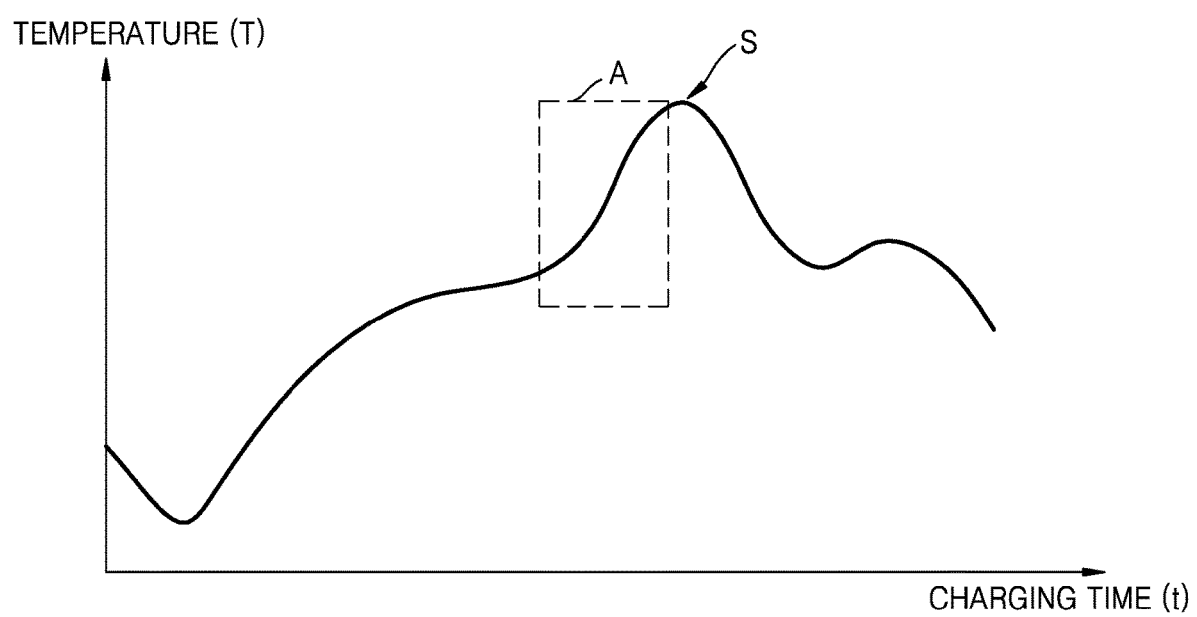
FIG. 2 is a graph showing a variation in an internal temperature of a battery during charging with a constant current-constant voltage.

FIG. 2 is a graph showing a variation in an internal temperature of a battery during charging with a constant current-constant voltage.

Referring to FIG. 2, a transverse axis denotes a charging time (t) of the battery 20, and a longitudinal axis denotes a value of an internal temperature (T) of the battery 20. When the battery 20 is charged by using a constant current-constant voltage charging method, a temperature variation occurs in time in the battery 20.

The battery 20 is charged by using the constant current-constant voltage charging method. In the constant current charging method, the battery 20 is charged by an external charging device (200 of FIG. 5) that applies a constant current to the battery 20. In the constant voltage charging method, the battery 20 is charged by the external charging device (200 of FIG. 5) that applies a constant voltage to the battery 20. In the constant current-constant voltage charging method, the battery 20 is charged with constant current, and then, when a voltage of the battery 20 reaches a predetermined voltage, e.g., 4.1 V, the battery 20 is charged with constant voltage.

Heat is generated during charging of the battery 20, and an amount of generated heat is in proportion to a magnitude of the constant current. Since an electric current with a relatively small magnitude is applied to the battery 20 in the constant voltage charging method, heat is largely generated in the battery 20 during constant current charging when an electric current with a relatively large magnitude is applied. During the constant current charging, an internal temperature of the battery 20 increases with a charging time of the battery 20. When the constant current charging is switched to the constant voltage charging, the magnitude of electric current applied to the battery 20 is reduced and the internal temperature of the battery 20 gradually decreases. In particular, the temperature of the battery 20 rapidly increases in part A. Part A is a section where the temperature rapidly increases and includes a point S where the internal temperature of the battery 20 that is in charging state is the highest. The battery 20 that is in charging state may actively generate a gas therein in the part A. When a phase transition of internal materials of the battery 20 occurs or when electrons in the battery 20 concentrate on a negative electrode and cause a side reaction with an electrolyte, an internal pressure increases in the part A, that is, a sudden temperature increase section may occur. In addition, the part A may occur in a certain SOC of the battery 20, and the SOC of the battery may have a value of 60% to 80% at the point S, where the internal temperature of the battery 20 is the highest in a secondary battery such as a lithium ion battery, a lithium polymer battery, etc.

When charging and discharging of the battery 20 are repeatedly performed, a gas is generated in the battery 20 and thus swelling of the battery 20 occurs. As the internal temperature of the battery 20 increases, an amount of generated gas in the battery 20 also increases. In particular, when the charging or discharging of the battery 20 is performed at high temperature, gas may be actively generated in the battery 20 and the swelling of the battery 20 is accelerated. In particular, in the battery 20 that is in the charging state, the temperature rapidly increase in the part A. The part A is a section where the internal temperature of the battery 20 rapidly increases and the gas is most actively generated in the battery 20 that is in the charging state. Therefore, when a temperature increase rate of the part A is reduced, progress of the swelling of the battery 20 may slow down and thus a lifespan of the battery 20 may increase.

In addition, the preset discharging time and the preset pausing time may be determined according to characteristics of the materials included in the battery cell 23. For example, when the charging of the battery 20 is continued, positive ions such as lithium ions, etc. that is a material included in the battery cell 23 and the electrons are not evenly arranged on the positive electrode of the battery cell 23. This may be caused by a difference between velocities of the positive ion such as lithium ions, etc., and the electron. In this case, the preset discharging time is set based on a time taken to evenly distribute the electrons and the positive ions such as lithium ions, etc. on the positive electrode of the battery cell 23, and the preset pausing time may be set based on a time taken to stabilize the chemical reaction in the battery, e.g., a time for reducing the side reaction. For example, the battery 20 such as the lithium ion battery may have the preset discharging time within a range of 10 seconds to 30 seconds and the preset pausing time within a range of 10 seconds to 60 seconds.

Figure 3:
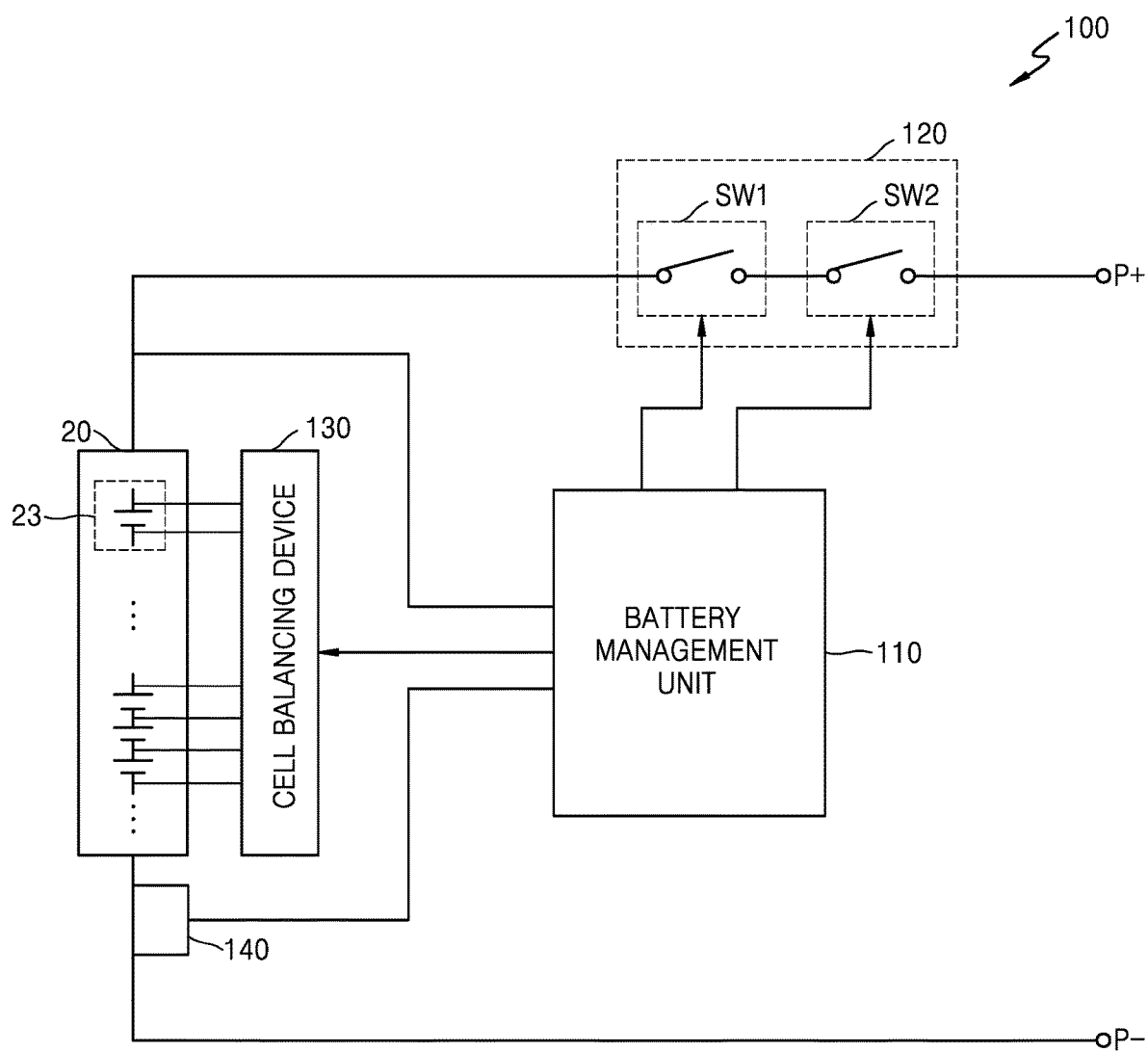
FIG. 3 shows an internal structure of a battery pack according to an embodiment.

FIG. 3 shows an internal structure of a battery pack according to an embodiment.

Referring to FIG. 3, the battery pack includes the battery 20, a temperature sensor 140, the charging switch SW1, the discharging switch SW2, the battery management unit 110, and the cell balancing device 130. Since the battery 20, the charging switch SW1, the discharging switch SW2, and the cell balancing device 130 are substantially the same as those illustrated with reference to FIG. 1, descriptions thereof are omitted.

The temperature sensor 140 is arranged adjacent to the battery 20. The temperature sensor 140 may be arranged adjacent to a negative electrode side of the battery 20, but is not limited thereto, that is, the temperature sensor 140 may be arranged at a location where the internal temperature of the battery 20 may be precisely measured. The temperature sensor 140 may be arranged adjacent to the battery cells 23 in the battery 20. For example, the temperature sensor 140 may be provided on conductive terminals of the battery cells 23 having high thermal conductivity, or may be provided on a bus bar connecting the battery cells 23. The battery pack may include a plurality of temperature sensors 140, the number of which may be equal to that of the battery cells 23.

The temperature sensor 140 may transfer information about sensed temperature of the battery 20 to the battery management unit 110. In addition, the temperature sensor 140 may include a thermistor having a resistance value that varies depending on a peripheral temperature. The temperature sensor 140 may include a thermistor having a negative temperature coefficient, that is, the resistance value decreases as the peripheral temperature increases, or a thermistor having a positive temperature coefficient, that is, the resistance value increases as the peripheral temperature increases.

The battery management unit 110 may determine a variation in the internal temperature of the battery 20. The battery management unit 110 may monitor the internal temperature of the battery 20 every time through the information transferred from the temperature sensor 140. In addition, the battery management unit 110 may further include a storage that stores the internal temperature of the battery 20. The battery management unit 110 may store the internal temperature of the battery 20 at every unit time, and may calculate an internal temperature increase rate of the battery 20 per unit time (hereinafter, temperature increase rate of the battery). The battery management unit 110 may compare the temperature increase rate of the battery 20 with a preset value.

In addition, the preset value is set to detect the part A described above with reference to FIG. 2 based on the temperature increase rate of the battery 20. That is, the preset value may be set taking into account the temperature increase rate of the battery 20 in the part A. For example, when the temperature increase rate of the part A having the largest internal temperature increase rate of the battery 20 in the charging state is about 2□C per second, the preset value may be set as 2□C or greater.

According to an embodiment, when the constant current charging of the battery 20 starts, the battery management unit 110 may monitor the temperature increase rate of the battery 20. When the temperature increase rate of the battery 20 is equal to or greater than the preset value, the battery management unit 110 may determine that the preset swelling condition that is described with reference to FIG. 1 is satisfied. When the temperature increase rate of the battery 20 is equal to or greater than the preset value, the battery management unit 110 applies a control signal for turning off the charging switch SW1 to the charging switch SW1 and applies a control signal for operating the cell balancing device 130 to the cell balancing device 130. In this case, the charging of the battery 20 is stopped, and then, the self-discharge of the battery 20 starts via the cell balancing device 130. When the battery 20 is discharged for the preset discharging time described above with reference to FIG. 2, the battery management unit 110 stops operating the cell balancing device 130. The battery management unit 110 pauses the battery 20 for the preset pausing time described above with reference to FIG. 2, in order to stabilize the internal material of the battery 20. When the pausing of the battery 20 for the preset pausing time finishes, the battery management unit 110 turns on the charging switch SW1 to restart the charging of the battery 20.

According to another embodiment, when the temperature increase rate of the battery 20 is equal to or greater than the preset value, the battery management unit 110 may determine whether the temperature increase rate of the battery 20 is maintained for a preset time period. When the temperature increase rate of the battery 20 maintains at the preset value or greater for the preset time period, the battery management unit 110 may determine that the preset swelling condition is satisfied. The temperature increase rate of the battery 20 that is in charging state may frequently vary, and the temperature increase rate of the battery 20 may temporarily have a value greater than the preset value. When the battery management unit 110 determines that the temporary rising of the temperature of the battery 20 satisfies the preset swelling condition, the discharging and pausing frequently occur and the total charging time of the battery 20 may increase. Therefore, the battery management unit 110 needs to monitor whether the temperature increase rate of the battery 20 remains equal to or greater than the preset value for the preset time period. For example, when the preset value is 0.2□C/sec. and the preset time period is 1 minute, the battery management unit 110 may monitor whether the temperature increase rate of the battery 20 maintains at 0.2□C/sec. for one minute from when the temperature increase rate reaches 0.2□C/sec. The battery management unit 110 does not stop the charging of the battery 20 immediately even when the temperature increase rate of the battery 20 has a value equal to or greater than 0.2□C/sec. The battery management unit 110 may stop the charging of the battery 20 when the temperature increase rate maintains at 0.2□C/sec. or greater for one minute.

Figure 4:
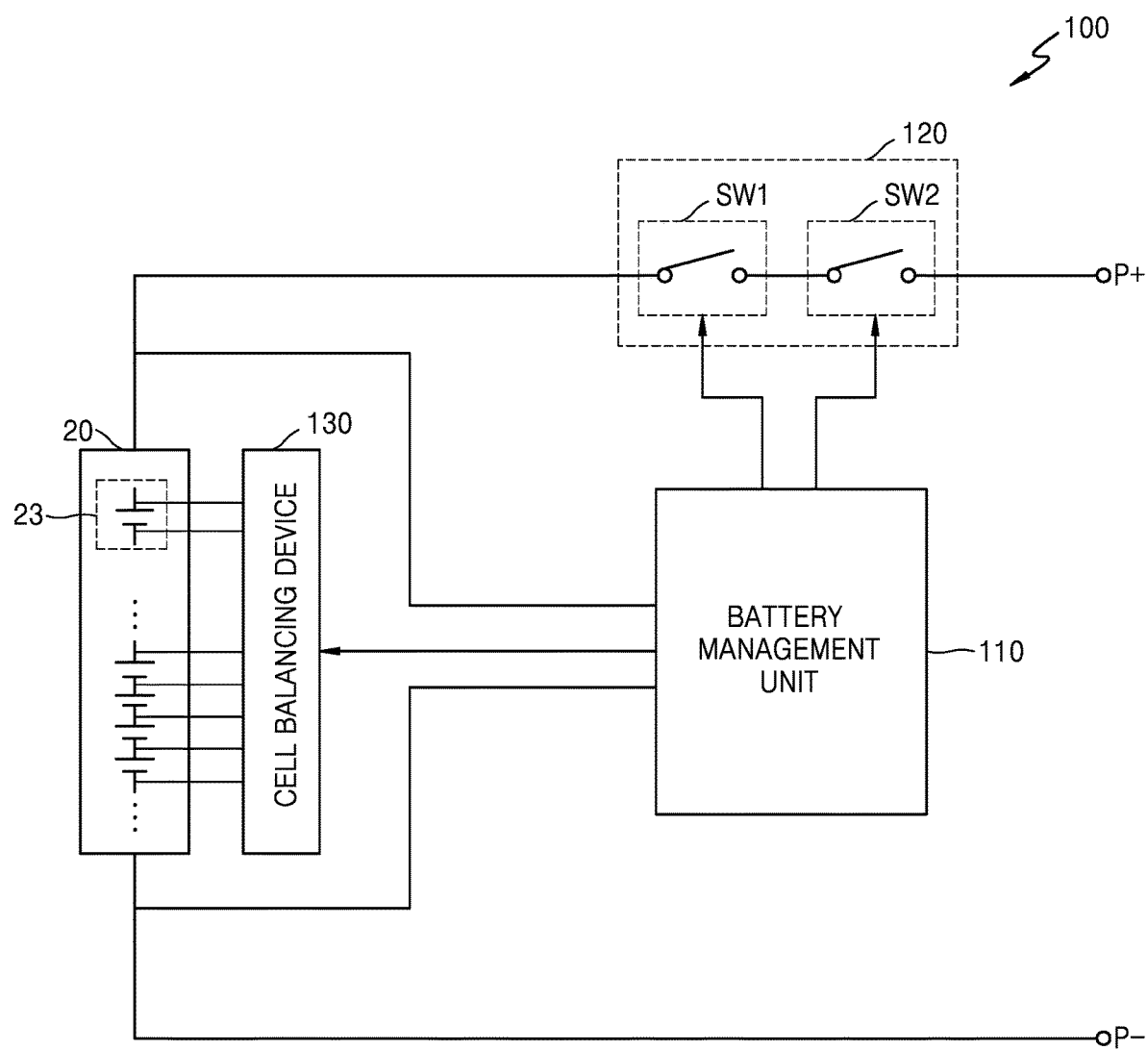
FIG. 4 shows an internal structure of a battery pack according to an embodiment.

FIG. 4 shows an internal structure of a battery pack according to an embodiment.

Referring to FIG. 4, the battery pack includes the battery 20, the charging switch SW1, the discharging switch SW2, the battery management unit 110, and the cell balancing device 130. Since the battery 20, the charging switch SW1, the discharging switch SW2, and the cell balancing device 130 are substantially the same as those illustrated with reference to FIG. 1, descriptions thereof are omitted.

The battery management unit 110 may sense an SOC of the battery 20. The battery management unit 110 may estimate the SOC of the battery 20 through a voltage variation according to a current integration method or DC-IR. That is, the battery management unit 110 may estimate an SOC value of the battery 20 based on a sensed voltage or current value of the battery 20. The battery management unit 110 may determine the SOC of the battery 20 by measuring the voltage of the battery 20. For example, the voltage of the battery 20 increases as the charging time of the battery 20 elapses, and the SOC value or whether the battery 20 is fully charged may be determined based on the voltage of the battery 20.

According to an embodiment, the battery management unit 110 may determine whether the state of the battery 20 satisfies the preset swelling condition, based on the estimated SOC value of the battery 20. When the SOC value of the battery 20 reaches a preset SOC value, the battery management unit 110 outputs a control signal for turning off the charging switch SW1 and a control signal for operating the cell balancing device 130. When the SOC value of the battery 20 reaches the preset SOC value, the battery management unit 110 may allow the battery 20 to stop the charging and start discharging. For example, when the preset SOC value is 65%, the battery management unit 110 estimates the SOC value of the battery 20 and monitors whether the SOC value of the battery 20 that is in charging state reaches 65%. When the SOC value of the battery 20 is estimated as 65%, the battery management unit 110 stops the charging of the battery 20 and discharges the battery 20 via the cell balancing device 130 as described above. In addition, when the charging of the battery 20 restarts after discharging and pausing the battery 20, the battery management unit 110 does not discharge and pause the battery 20 even when the SOC value of the battery 20 is 65%. For example, the number of times of determining the swelling condition according to the SOC may be limited to once, according to the number of charging operations. Alternatively, after a predetermined time period passes from the discharging and pausing of the battery 20, the battery management unit 110 may check whether the SOC value of the battery 20 reaches 65%.

In addition, the preset SOC value may be set based on the part A that is described above with reference to FIG. 2. The part A is shown at a certain SOC value due to the characteristic of the internal material of the battery 20 or the charging environment. In particular, in a secondary battery such as a lithium polymer battery, etc., the part A is shown at the SOC value of 60% or greater. In this regard, the preset SOC value may be set within a range of 60% to 70%. For example, when the secondary battery such as a lithium polymer battery, etc. has an SOC value of 60% to 70%, the phase transition of the internal material included in the battery 20 is actively performed. Due to the phase transition, the internal temperature of the battery 20 may rapidly increase. In this regard, the section where the internal temperature of the battery 20 rapidly increases may be predicted as the SOC value of the battery 20 without monitoring the internal temperature increase rate of the battery 20.

According to another embodiment, when the SOC of the battery 20 is equal to or greater than the preset SOC value and the temperature increase rate sensed by the temperature sensor 140 described with reference to FIG. 3 is equal to or greater than the preset value, the battery management unit 110 may determine that the swelling condition is satisfied. The internal temperature of the battery 20 that is in the charging state may temporarily show a sudden increase. When the discharging and pausing are frequently performed even in a case where the internal temperature of the battery 20 temporarily shows a sudden increase, the total charging time of the battery 20 may increase. Therefore, in order to discharge the battery and pause discharging of the battery 20 in the part A described above with reference to FIG. 2, the battery management unit 110 may consider the temperature increase rate of the battery 20 when the estimated SOC value of the battery 20 is equal to or greater than the preset SOC value. For example, the battery management unit 110 monitors the SOC value of the battery 20. When the SOC value of the battery 20 is equal to or greater than the preset SOC value, the battery management unit 110 starts monitoring of the temperature increase rate of the battery 20. When the temperature increase rate of the battery 20 is equal to or greater than the preset value, the battery management unit 110 turns off the charging switch SW1 and operates the cell balancing device 130 to stop the charging of the battery 20 and discharge the battery 20. When the preset discharging time passes, the battery management unit 110 pauses discharging of the battery 20 for the preset pausing time in order to stabilize the internal material of the battery 20. When the preset pausing time passes, the battery management unit 110 turns on the charging switch SW1 to restart the charging of the battery 20.

According to another embodiment, when the voltage of the battery 20 reaches a preset voltage, the battery management unit 110 may determine that the preset swelling condition that is described with reference to FIG. 1 is satisfied. The preset voltage may be set as a voltage corresponding to the part A described with reference to FIG. 2. The battery management unit 110 monitors the voltage of the battery 20, and when the voltage reaches the preset voltage, the battery management unit 110 temporarily stops the charging of the battery 20. The battery management unit 110 discharges the battery 20 for the preset discharging time described above with reference to FIG. 2 and pauses discharging of the battery 20 for the preset pausing time. When the preset pausing time passes, the battery management unit 110 restarts the charging of the battery 20.

According to another embodiment, the battery management unit 110 may change the preset voltage value, according to the number of charging/discharging operations of the battery 20. When the number of charging/discharging operations of the battery 20 increases, the battery 20 deteriorates. As the deterioration of the battery 20 proceeds, the part A may be shown at a greater voltage of the battery 20.

Therefore, when the number of charging/discharging operations of the battery 20 increases, the battery management unit 110 changes the predetermined voltage value to a greater value. For example, when the preset voltage value at an initial stage of manufacturing the battery 20 is 4.1 V, the battery management unit 110 may change the voltage value to 4.15 V when the number of charging/discharging operations of the battery 20 is 100. When the number of charging/discharging operations of the battery 20 is 200, the battery management unit 110 may change the voltage value to 4.18 V.

Figure 5:
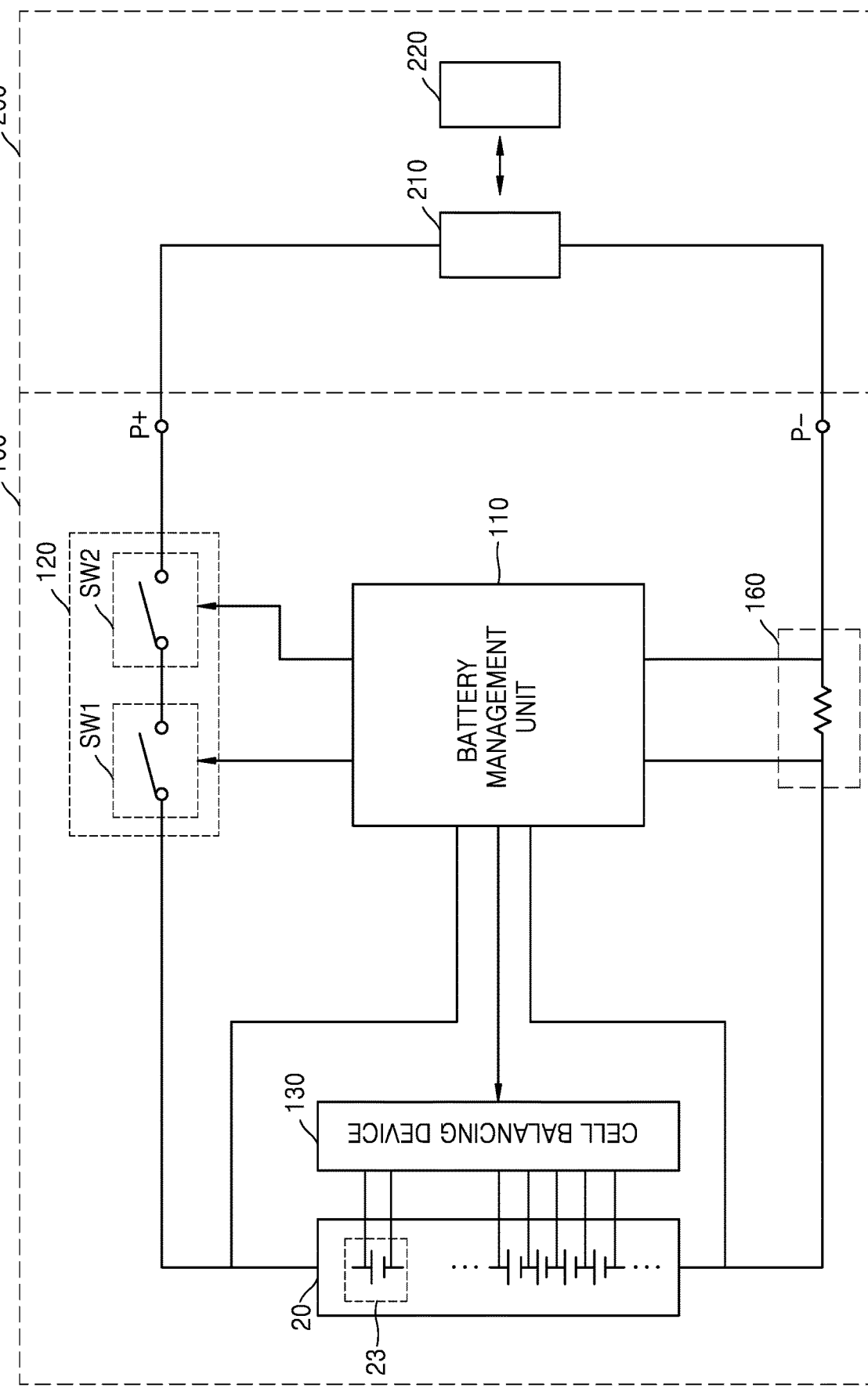
FIG. 5 shows an internal structure of a battery pack to which a constant current-constant voltage charging device is connected.

FIG. 5 shows an internal structure of a battery pack to which a constant current-constant voltage charging apparatus is connected.

Referring to FIG. 5, the battery pack includes the battery 20, the charging switch SW1, the discharging switch SW2, the battery management unit 110, and the cell balancing device 130. Since the battery 20, the charging switch SW1, the discharging switch SW2, and the cell balancing device 130 are substantially the same as those illustrated with reference to FIG. 1, descriptions thereof are omitted.

A charging device 200 includes a charger 210 and a charging controller 220. The charging device 200 may apply the constant current or the constant voltage to the battery pack in the constant current-constant voltage charging method.

The charger 210 is controlled by the charging controller 220, and may apply the constant current having a predetermined magnitude or the constant voltage having a predetermined magnitude to the battery pack according to control of the charging controller 220. The charging controller 220 may monitor a voltage between terminals of the battery pack to control the charger 210. The charging controller 220 may determine a constant current charging mode or a constant voltage charging mode based on the monitored voltage. The constant current charging mode is a mode for controlling the charger 210 to apply a predetermined current to the battery pack. The constant voltage charging mode is a mode for controlling the charger 210 to apply a predetermined voltage to the battery pack. When the voltage of the battery pack reaches a preset switching voltage value, the charging controller 220 switches the mode of the charger 210 from the constant current charging mode to the constant voltage charging mode. In addition, the charging controller 220 may charge the battery 20 with two or more constant currents having different magnitudes from each other in the constant current charging mode. Such above charging method is referred to as a step charging, and the magnitude of the constant current may be transformed by comparing the monitored voltage with preset voltage values.

A current sensor 160 may sense a current of the battery 20, that is, an electric current flowing between the battery 20 and an external terminal. The current sensor 160 may transfer information about the sensed current to the battery management unit 110.

The battery management unit 110 may monitor the information about the current transferred from the current sensor 160. When the charging device 200 is connected to the terminal of the battery pack, the battery management unit 110 turns on the charging switch SW1 of the battery 20 and turns off the discharging switch SW2 to charge the battery 20. When the battery 20 is charged with the constant current, the battery management unit 110 monitors a magnitude of the constant current applied to the battery 20.

According to an embodiment, the battery management unit 110 may determine that the preset swelling condition described above with reference to FIG. 1 is satisfied when the magnitude of the constant current applied to the battery 20 is changed. The battery management unit 110 monitors the magnitude of the constant current applied to the battery 20, and when the magnitude of the constant current is changed, the battery management unit 110 turns off the charging switch SW1 of the battery 20. That is, the battery management unit 110 monitors the magnitude of the electric current applied to the battery 20, and temporarily blocks the constant current applied to the battery 20 when the magnitude of the constant current is changed. The battery management unit 110 discharges the battery 20 for the preset discharging time described above with reference to FIG. 2, and then, pauses discharging of the battery 20 for the preset pausing time. The preset pausing time elapses, the battery management unit 110 restarts the constant current charging of the battery 20.

Figure 6:
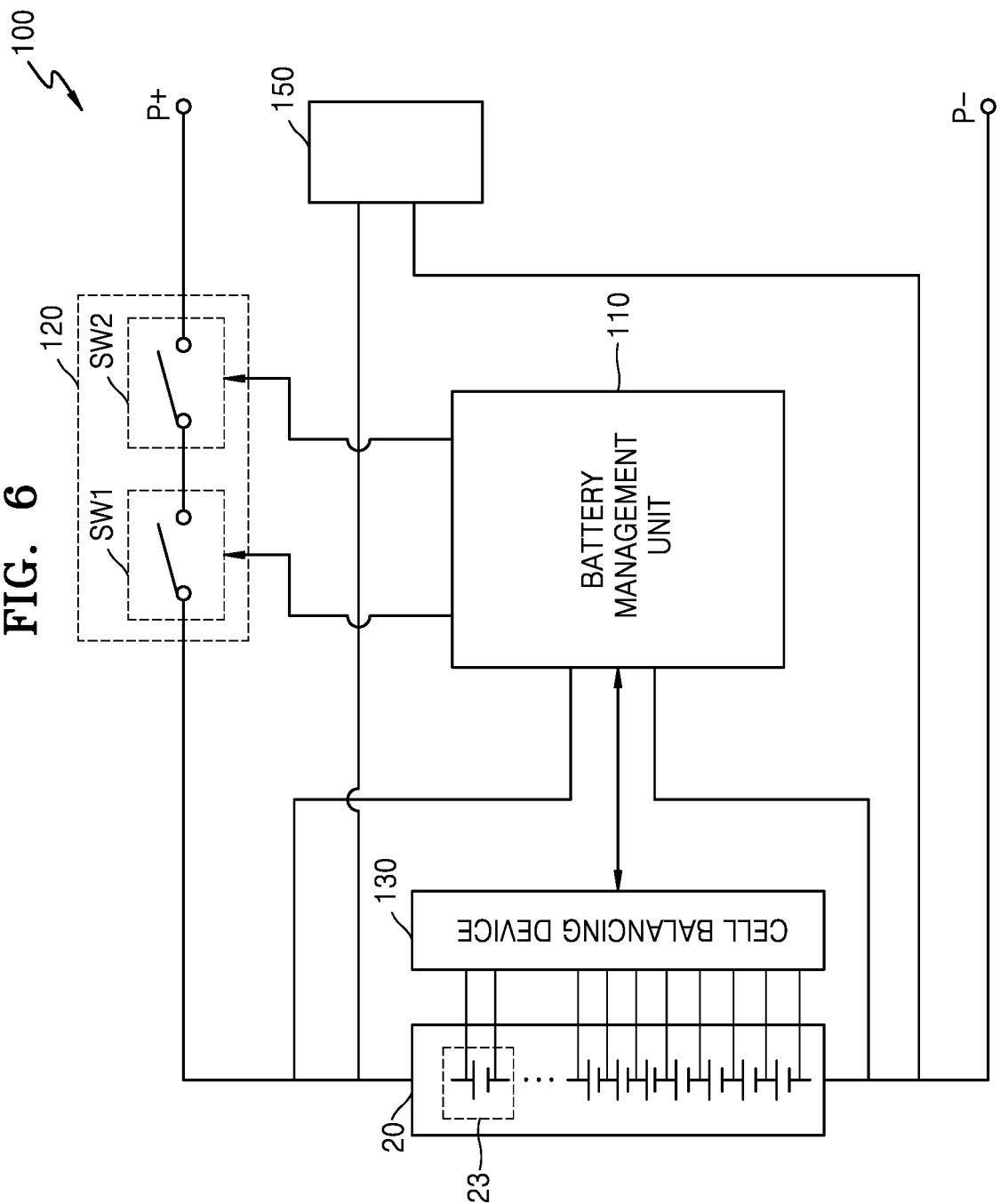
FIG. 6 shows an internal structure of a battery pack according to an embodiment.

FIG. 6 shows an internal structure of a battery pack according to an embodiment.

Referring to FIG. 6, the battery pack includes the battery 20, the charging switch SW1, the discharging switch SW2, the battery management unit 110, the cell balancing device 130, and a self-discharge unit 150. Since the battery 20, the charging switch SW1, the discharging switch SW2, and the cell balancing device 130 are substantially the same as those illustrated with reference to FIG. 1, descriptions thereof are omitted.

The self-discharge unit 150 is electrically connected to the positive electrode and the negative electrode of the battery 20, and is electrically connected to the battery management unit 110. Whether to operate the self-discharge unit 150 may be determined according to a control signal from the battery management unit 110. The self-discharge unit 150 may include a self-discharge switch and a passive device. When the self-discharge switch is turned on, the battery 20 and the self-discharge unit 150 may form an additional closed loop. When the self-discharge switch is turned on, the passive device consumes the electric power of the battery 20 to discharge the battery 20.

According to an embodiment, when the temperature increase rate of the battery 20 described with reference to FIG. 3 is equal to or greater than the preset value, the battery management unit 110 may operate the self-discharge unit 150. When the temperature increase rate of the battery 20 is equal to or greater than the preset value, the battery management unit 110 turns on the self-discharge switch to operate the self-discharge unit 150. In this case, the battery management unit 110 turns off the charging switch SW1 to stop the charging of the battery 20. The battery management unit 110 operates the self-discharge unit 150 for the preset discharging time that is described with reference to FIG. 3. When the preset discharging time passes, the battery management unit 110 stops operating of the self-discharge unit 150, and pauses self-discharging of the battery 20 for the preset pausing time described with reference to FIG. 3 so that the battery 20 may not be charged or discharged. When the preset pausing time elapses, the battery management unit 110 turns on the charging switch SW1 to restart the charging of the battery 20. In addition, the battery management unit 110 may also operate the cell balancing device 130 when operating the self-discharge unit 150 to discharge the battery 20.

According to another embodiment, when the SOC value of the battery 20 is equal to or greater than the preset SOC value described with reference to FIG. 4, the battery management unit 110 may operate the self-discharge unit 150. The battery management unit 110 monitors the SOC value of the battery 20, and at a time point when the SOC value is equal to or greater than the preset SOC value, the battery management unit 110 applies a control signal for turning on the self-discharge switch of the self-discharge unit 150. In this case, the battery management unit 110 turns off the charging switch SW1 to stop the charging of the battery 20. The battery management unit 110 operates the self-discharge unit 150 for the preset discharging time. When the preset discharging time elapses, the battery management unit 110 stops operating of the self-discharge unit 150, and pauses self-discharging of the battery 20 for the preset pausing time so that the battery 20 may not be charged or discharged. When the preset pausing time elapses, the battery management unit 110 turns on the charging switch SW1 to restart the charging of the battery 20.

In addition, the self-discharge unit 150 is shown to be included in the battery pack, but is not limited thereto. That is, the self-discharge unit 150 may be located on an outer portion of the battery pack and may discharge the battery 20 according to control of the battery management unit 110.

While the present disclosure has been particularly shown and described with reference to preferred embodiments thereof, it will be understood by those skilled in the art that various changes in form and details may be made therein without departing from the spirit and scope of the present disclosure as defined by the appended claims. The preferred embodiments should be considered in descriptive sense only and not for purposes of limitation. Therefore, the scope of the present disclosure is defined not by the detailed description of the disclosure but by the appended claims, and all differences within the scope will be construed as being included in the present disclosure.

The invention claimed is:

1. A battery pack comprising:
a battery comprising at least one battery cell;
a cell balancing device configured to balance a voltage of the at least one battery cell;
a switch unit comprising a charging switch and a discharging switch arranged on a high current path through which a charging current and a discharging current flow;
a battery management unit configured to monitor a voltage and a current of the battery, to control the cell balancing device, and to control charging and discharging operations of the battery; and
a temperature sensor configured to sense a temperature of the battery,
wherein,
in response to a state of the battery during charging with a constant current satisfying a preset swelling condition, the battery management unit is configured to operate the cell balancing device for a preset discharging time to make the battery self-discharge,
in response to the preset discharging time elapsing, the battery management unit is configured to pause the battery from self-discharging for a preset pausing time, and
in response to the preset pausing time elapsing, the battery management unit is configured to charge the battery, and wherein the preset swelling condition is a condition in which a variation in the temperature sensed by the temperature sensor according to time is equal to or greater than a preset value.

2. The battery pack of claim 1, further comprising a self-discharge unit connected to the battery in parallel and configured to discharge the battery according to control of the battery management unit,
wherein the battery management unit is configured to operate the self-discharge unit to make the battery self-discharge.

3. The battery pack of claim 1, wherein satisfying the preset swelling condition further comprises a state of charge (SOC) of the battery reaching a preset SOC value.

4. The battery pack of claim 1, wherein the battery is charged with a variable constant current, and the battery management unit is configured to determine that the preset swelling condition is further satisfied when a magnitude of the constant current changes.

5. The battery pack of claim 3, wherein the preset SOC value is within a range of about 60% to about 80%.

6. The battery pack of claim 1, wherein the preset swelling condition comprises a case in which a state of charge (SOC) of the battery is equal to or greater than a preset SOC value.

7. A method of charging a battery pack, the method comprising:
charging a battery with a constant current;
sensing a preset swelling condition by
sensing a variation in a temperature of the battery; and
determining that the preset swelling condition is satisfied when a slope of the variation in the temperature is equal to or greater than a preset slope;
discharging the battery for a preset discharging time in response to the battery satisfying the preset swelling condition;
pausing the battery from discharging for a preset pausing time in response to the preset discharging time elapsing; and
restarting the charging of the battery in response to the preset pausing time elapsing.

8. The method of claim 7, wherein the sensing of the preset swelling condition further comprises:
monitoring a state of charge (SOC) of the battery; and
determining that the preset swelling condition is satisfied when the SOC of the battery is equal to or greater than a preset SOC value.

9. The method of claim 7, wherein, in the charging of the battery, the battery is charged with a variable constant current.

10. The method of claim 9, wherein the sensing of the preset swelling condition further comprises:
monitoring a magnitude of the constant current applied to the battery; and
determining that the preset swelling condition is satisfied when the magnitude of the constant current changes.

11. The method of claim 7, wherein, in the discharging of the battery, the battery is discharged by using a cell balancing device.

* * * * *